United States Patent [19]

Apfeld et al.

[11] Patent Number: 5,230,933

[45] Date of Patent: Jul. 27, 1993

[54] ACID RESISTANT PEELABLE CASING

[75] Inventors: Patrick B. Apfeld, Signal Mountain, Tenn.; Frederick M. Merritt, II, Lockport, Ill.

[73] Assignee: Viskase Corporation, Chicago, Ill.

[21] Appl. No.: 551,225

[22] Filed: Jul. 11, 1990

[51] Int. Cl.$^5$ .................. F16L 11/02; A22C 13/00
[52] U.S. Cl. ................. 428/34.8; 138/118.1; 426/105; 426/135; 426/138; 428/534; 428/536
[58] Field of Search ............... 138/118.1; 428/34.8, 428/534, 536; 426/135, 138, 105

[56] References Cited

U.S. PATENT DOCUMENTS

| | | | |
|---|---|---|---|
| 1,631,723 | 6/1927 | Freund | 17/1 |
| 2,424,346 | 7/1947 | Wilcoxon | 17/1 |
| 2,514,660 | 7/1950 | McClure et al. | 17/1 |
| 2,686,927 | 8/1954 | Grey | 17/1 |
| 2,757,409 | 12/1956 | Parkes et al. | 17/1 |
| 2,901,358 | 8/1959 | Underwood et al. | 99/176 |
| 2,984,574 | 5/1961 | Matecki | 99/176 |
| 3,106,471 | 10/1963 | Firth | 99/109 |
| 3,158,492 | 11/1964 | Firth | 99/176 |
| 3,262,789 | 7/1966 | Broumand et al. | 99/229 |
| 3,307,956 | 3/1967 | Chiu et al. | 99/176 |
| 3,312,995 | 4/1967 | Garey | 17/1 |
| 3,330,669 | 7/1967 | Hollenbeck | 99/166 |
| 3,361,577 | 1/1968 | Simon et al. | 99/176 |
| 3,442,663 | 5/1969 | Turbak | 99/176 |
| 3,451,827 | 6/1969 | Bridgeford | 99/176 |
| 3,487,499 | 1/1970 | Klyce | 17/1 |
| 3,494,772 | 2/1970 | Bradshaw et al. | 426/277 |
| 3,558,331 | 1/1971 | Tarika | 99/176 |
| 3,608,973 | 9/1971 | Klyce | 302/2 |
| 3,753,740 | 8/1973 | Turbak et al. | 426/135 |
| 3,818,947 | 6/1974 | Rose | 426/135 |
| 3,898,348 | 8/1975 | Chiu et al. | 426/413 |
| 3,981,046 | 9/1976 | Chiu | 17/49 |
| 4,104,408 | 8/1978 | Chiu | 426/135 |
| 4,137,947 | 2/1979 | Bridgeford | 426/135 |
| 4,171,381 | 10/1979 | Chiu | 426/105 |
| 4,196,220 | 4/1980 | Chiu et al. | 426/105 |
| 4,248,900 | 2/1981 | Hammer et al. | 426/105 |
| 4,278,694 | 7/1981 | Chiu | 426/135 |
| 4,356,218 | 10/1982 | Chiu et al. | 427/355 |
| 4,431,032 | 2/1984 | Nicholson | 138/118.1 |
| 4,431,033 | 2/1984 | Nicholson | 138/118.1 |
| 4,500,576 | 2/1985 | Nicholson et al. | 428/34.8 |
| 4,505,939 | 3/1985 | Chiu | 426/135 |
| 4,511,613 | 4/1985 | Nicholson et al. | 428/348 |
| 4,525,397 | 6/1985 | Chiu | 428/34.8 |
| 4,540,613 | 9/1985 | Nicholson et al. | 428/34.8 |
| 4,594,251 | 6/1986 | Nicholson | 426/262 |
| 4,792,457 | 12/1988 | Brna et al. | 426/574 |
| 4,818,551 | 4/1989 | Stall et al. | 426/420 |
| 4,844,129 | 7/1989 | Bridgeford et al. | 138/118.1 |
| 4,981,707 | 1/1991 | Morris | 426/93 |

FOREIGN PATENT DOCUMENTS

| | | |
|---|---|---|
| 862042 | 1/1971 | Canada . |
| 723323 | 2/1955 | United Kingdom . |
| 1086604 | 10/1967 | United Kingdom . |

OTHER PUBLICATIONS

Roberts, John D., *Basic Principles of Organic Chemistry*, pp. 618, 637 (W. A. Benjamin, Inc., 1964).

"Specification for Centrolex P, Granular Soybean Lecithin (Product Code 6420)", 1 page (Central Soya, Inc., Aug. 1, 1988).

"The Lecithin Book", 15 pages (Central Soya Co., Inc., Dec. 1989).

"Lecithins As Emulsifiers", 6 pages (Central Soya Co., Inc., 1989).

Rutenberg, M. W., "Starch and Its Modifications", in: Whistler R. L., *Handbook of Water-Soluble Gums adn Resins*, Chapter 22, (McGraw Hill, Inc., 1980).

Satterthwaite R. W., et al. "Starch Dextrins", in: Whistler R. L., *Industrial Gums*, 2nd Ed., pp. 577–599 (Academic Press, 1973).

Kennedy, H. M., "Starch and Dextrins in Prepared Adhesives", in Whistler, R. L., *Starch Chemistry and Technology*, pp. 593–599 (Academic Press, 1984).

Primary Examiner—Ellis P. Robinson
Assistant Examiner—Rena L. Dye
Attorney, Agent, or Firm—Cedric M. Richeson

[57] ABSTRACT

Acid resistant peeling aid compositions and casings, particularly tubular cellulosic food casings, coated therewith, which compositions contain a water-soluble cellulose ether, dextrin and optionally lecithin.

45 Claims, No Drawings

ACID RESISTANT PEELABLE CASING

The present invention relates to food casing, especially cellulosic food casing having coatings which enhance peelability of the casing from an encased foodstuff while preferably permitting formation of shirred sticks of casing.

Food casings used in the processed food industry are generally thin-walled tubing of various diameters prepared from regenerated cellulose, cellulose derivatives, alginates, collagen and the like.

In general, food casings have multifunctional uses in that they may be employed as containers during the processing of the food product encased therein and also serve as a protective wrapping for the finished product. In the sausage meat industry, however, the preparation of various types of sausages including frankfurters in a variety of sizes usually involves removing the casing from about the processed meat prior to final packaging.

In the manufacture of regenerated cellulose sausage casings, viscose is typically extruded through an annular die into a coagulating and regenerating bath to produce a tube of regenerated cellulose. This tube is subsequently washed, plasticized e.g. with glycerine, and dried e.g. by inflation under substantial air pressure. After drying, the casing is wound on reels and subsequently shirred on high-speed shirring machines, such as those described in U.S. Pat. Nos. 2,984,574, 3,451,827 3,454,981; 3,454,982; 3,461,484; 3,988,804 and 4,818,551. In the shirring process, lengths of from about 40 to about 200 feet of casing are typically compacted (shirred) into tubular sticks of between about 4 and about 30 inches. The shirred casing sticks are packaged and provided to the meat processor who typically causes the casing sticks to be deshirred at extremely high speeds while stuffing the deshirred casing with a meat emulsion. The meat can be subsequently cooked and the casing removed from the meat processed therein with high-speed peeling machines.

Cellulosic casings are typically humidified to a level sufficient to allow the casing to be shirred without undue breakage from brittleness yet humidification must be at a level low enough to prevent undue sticking of the casing to the shirring equipment e.g. the mandrel during the shirring operation. Often a humectant is employed to moderate moisture retention and casing swelling to produce a casing which during the shirring operation has sufficient flexibility without undue swelling or stickiness. Typically, a lubricant such as an oil will also be used to facilitate passage of the casing through the shirring equipment e.g. over a shirring mandrel.

It has been useful to lubricate and internally humidify cellulose casings during the shirring process by spraying a mist of water and a stream of lubricant through the shirring mandrel. This is an economical, fast and convenient way to lubricate and/or humidify the casing to increase the flexibility of the casing and facilitate high speed shirring without undue detrimental sticking, tearing or breakage of the casing.

Peeling the casing from the processed sausage has presented problems, particularly in the production of so called "skinless" frankfurters where large numbers of the product are involved and the desire in commercial operations is to use high-speed, automatic stuffing and peeling machines.

In the formation of skinless (casing removed) frankfurters, sausage proteins coagulate, particularly at the sausage surface, to produce a skin and allow formation of a liquid layer between this formed skin and the casing as described in Freund U.S. Pat. No. 1,631,723. In the art the term "skinless frankfurter" is understood to mean that the casing is or is intended to be removed and that such casing may be removed because of formation of a secondary "skin" of coagulated proteins on the surface of the frankfurter. This secondary skin forms the outer surface of the so called "skinless frankfurters". Skin formation is known to be produced by various means including the traditional smoke curing with gaseous smoke, low temperature drying, application of acids such as citric acid, acetic acid or acidic liquid smoke or combinations thereof. Desirably, this secondary skin will be smooth and cover the surface of the frankfurter. Formation of a liquid layer between the casing and the frankfurter skin relates to the meat emulsion formulation, percent relative humidity during the cooking environment, subsequent showering and steam application to the chilled frankfurter. Control of these factors, as well as controlling frankfurter skin formation, is not always sufficient to maintain 100% peelability on a production basis.

When the casing is removed from the meat mass, there is occasionally a tendency for some meat to adhere to the casing and be torn from the sausage with the casing, thereby causing surface marring of the sausage. In other instances, variations in the meat emulsion formulations or in the processing conditions can result in a degree of adherence of the casing to the product which hinders rapid removal of the casing from the product encased therein. The use of high-speed, automatic peeling machines in commercial operations, for example, as disclosed in U.S. Pat. Nos. 2,424,346; 2,514,660; 2,686,927; 2,757,409; 3,312,995; 3,487,499; and 3,608,973 makes it particularly essential that there be minimal resistance to the separation of casing from sausage, or the product will jam at the peeler or go through unpeeled. Less than complete removal of the casing necessitates the expense and inconvenience of hand sorting and peeling.

Heretofore, many attempts have been made to provide casings having easy release characteristics. It is known in the art, as disclosed, for example, in U.S. Pat. Nos. Underwood et al. 2,901,358, Firth 3,106,471 and 3,158,492, Chiu et al. 3,307,956, Turbak 3,442,663 and Tarika 3,558,331, that the application of certain types of coating to the inside wall of food casings may afford improvement in the release characteristics of the casing from the encased sausage product. Use of peeling aids or release coatings have helped to overcome these peelability problems. Following cooking, cooling and hydrating water-soluble cellulose ether containing peeling aids help release the casing from the frankfurter skin by formation of a slippery layer between the casing and the frankfurter skin.

In U.S. Pat. No. 3,898,348, the coating of internal surfaces of cellulose sausage casings with a homogeneous mixture of a water-soluble cellulose ether and an additive selected from animal, vegetable, mineral and silicon oils and alkylene oxide adducts of partial fatty acid esters was taught. The coating is applied to the casing surface in a composition such that the additive is present in a proportion of about 0.1 times the weight of the water soluble cellulose ether and up to about 0.5 milligrams per square inch of casing surface. Such mixtures have excellent meat release characteristics and can also effectively protect the casing from "pinholing" failures occasioned by pleat locking. Easy peeling casings utilizing the release coating have found broad commercial acceptance and are presently in use in casings throughout the world.

Bridgeford U.S. Pat. No. 4,137,947 discloses a method of improving the meat release (peelability) of cellulose sausage casings by the application of a meat release coating to the internal surface thereof. The coating comprises a homogeneous admixture of a water-soluble cellulose ether, the partial fatty acid ester of sorbitan or mannitan and a water-soluble polyalkylene ether of the type $R(-OC_2H_4O)_n-H$ wherein R represents long chain alkyl radicals having 8 to 16 carbon atoms and n is an integer from 4 to 40. An aqueous coating composition containing the water-soluble cellulose ether, partial fatty acid ester and polyalkylene ether is typically applied the interior of the sausage casing prior to shirring.

The foregoing peeling aid coatings have been utilized with varying degrees of success to provide cellulosic casings capable of being peeled on high speed machine peelers. Generally such cellulosic casings either with or without peeling aid coatings have an approximately neutral pH with pH values typically falling within a range of about 5.9 to 8.6.

However, prior art peeling aids are not as effective in low pH environments (pH<5) as they are at pH values closer to neutral (pH=7). Water-soluble cellulose ether-containing peeling aids are very effective at promoting peeling of casings whose pH values are about 6 or higher. However, the expense of casings containing such coatings has in part led some sausage makers to continue employing an acid shower prior to cooking for regular casings which do not employ cellulose ether peeling aids. In an acid shower system, the stuffed encased sausages are subjected to showing with an acidic aqueous solution of e.g. acetic acid, citric acid or acidic liquid smoke prior to cooking. Use of such an acid shower system causes increased "skin" formation on the surface of the sausage. This increased skin formation assists in the peelability of casings. Use of acid showering requires capital outlays for special equipment to handle use of the acid and has increased maintenance costs due to the corrosive effects of the use of acids. Use of casing containing a water-soluble cellulose ether peeling aid does not require acid showering for good peelability; excellent peelability is realized without use of acid. Occasionally, casings utilizing a water-soluble cellulose ether-containing peeling aid have been subjected to acid showering prior to cooking and it has been found that such showering may decrease the peelability of casings having water-soluble cellulose ether peeling aids. It is believed, without wishing to be bound by that belief, that the acid reacts with the cellulose ether converting it to a water insoluble form of the ether.

Also, some specialty casings may be intentionally manufactured as acidic casings and/or they may become more acidic either upon aging or exposure to elevated temperatures. Such acidic casings may have initial pH values of less than 7 and usually about 6 or less. These pH values may decrease to 5.5, 5, 4 or even lower during storage and/or exposure to heat.

For example, regenerated cellulosic casings may be treated with acids such as ascorbic acid, citric acid and d-tartaric acid as reducing agents or oxidation inhibitors e.g. as described in Simon et al. U.S. Patent No. 3,361,577 to provide a red cured color to the surface of meat emulsion stuffed therein, or casing may be impregnated or coated either externally or internally with liquid smoke as described e.g. in U.S. Pat. Nos. 3,330,669; 4,104,408; 4,171,381; 4,196,220; 4,278,694; 4,431,032; 4,431,033; 4,500,576; 4,505,939; 4,525,397; 4,540,613; and 4,594,251. Such liquid smokes used to treat casings may be either tar-containing or tar-depleted and may also be acidic, or partially neutralized upon initial application of the liquid smoke to the casing. It is further known that liquid smokes including some neutralized smokes may upon aging or exposure to elevated temperatures become more acidic.

Disadvantageously, it has been discovered that non-fiber reinforced (nonfibrous) casings treated with a liquid smoke such as a concentrated, acidic, tar-depleted liquid smoke in accordance, for example, with the teaching of U.S. Pat. No. 4,540,613 have undesirably low peelability on high speed peelers when processed by the acid shower treatment method described above. Also, such casings have undesirably low peelability when used in conjunction with peeling aid coatings such as the commercially accepted and widely used water-soluble cellulose ether based peeling aid coatings. This is believed to be due to the liquid smoke treated casing's acidic nature and tendency to become more acidic (with a corresponding lowering of pH) either over time during storage and/or upon exposure to elevated temperatures.

SUMMARY OF THE INVENTION

The present invention seeks to overcome the aforementioned deficiencies in prior art peeling of nonfibrous casings by providing an acid resistant peeling aid composition and machine peelable casing coated therewith.

The peeling aid composition according to the present invention comprises a mixture of a water-soluble cellulose ether such as carboxymethylcellulose with a dextrin. Preferably such composition will also include lecithin and to facilitate formation of self-sustaining, deshirrable, shirred sticks of casing will also preferably contain an anti-pleat lock agent, such as an oil, and a surfactant. Other ingredients may also be utilized e.g. in shirring solutions. Typically employed casing additives are known to the art and may include, for example, humectants, antimycotics, lubricants and antioxidants.

The tubular food casing according to the present invention comprises an acid resistant release coating of a mixture of a water-soluble cellulose ether and dextrin. This mixture is coated on the inner surface of the casing in an amount sufficient to provide a peelable casing, especially a casing which is machine peelable, particularly on high speed peelers. Preferably the mixture will include lecithin and may include other components including the preferred components as described above with respect to the peeling aid composition.

Both the inventive peeling aid composition and the inventive coated casing containing the peeling aid are termed "acid resistant" herein. By use of the term "acid resistant" is meant that the peeling aid composition facilitates, and the coated casing is capable of, high speed machine peeling and removal of the casing from the encased product without undue damage to the peeled product or jamming of the peeling machine when the composition is coated on a food contacting surface of a casing such as a regenerated cellulose casing, which casing is either acidic or has a tendency to become more acidic over time and/or exposure to heat. The inventive coating and coated casing is beneficial for peeling casings whose pH values are acidic (pH<7) especially casings having pH values which are or have become less than about 6.0 and particularly less than about 5.5 with the benefits of the invention increasing with decreasing pH values. The invention is particularly advantageous for casings having a pH of about 5.0 or less. Casings coated according to the present invention which have become acidic, particularly liquid smoke treated casings, may have improved peeling relative to the peelability of casings which are not coated with the inventive coating. Casing pH values referred to herein are to values which may be determined by the method described below unless indicated otherwise.

Casing pH is measured by cutting a forty inch (102 cm.) length of deshirred casing into small pieces and vigorously shaking the pieces with 25 ml of deionized water in a flask followed by standing for 20 minutes with a subsequent second period of shaking. The pH is measured with a pH meter after allowing the casing pieces in the liquid to settle.

The term "nonfibrous" is used here to mean without use of fiber reinforcement (e.g. a paper tube) in the casing and nonfibrous is most commonly understood in the art to refer to casings such as those used to process small diameter sausages including wieners or frankfurters.

DETAILED DESCRIPTION

The invention is a novel acid resistant release coated food casing. The invention is particularly useful with acidic casings, particularly tubular nonfibrous casings adapted for processing foodstuffs such as sausages especially frankfurters. The novel peeling aid composition acts as a release agent e.g. after cooking frankfurters in a smokehouse whereby the casing may be easily and rapidly peeled off of the encased foodstuff. In particular, such casing removal may be accomplished much faster than could be accomplished by hand. Such fast removal utilizes high speed machine peelers able to peel casing at rates, for example, of over 200 linear feet (61 meters) of encased sausage in 30 seconds.

Casings may be made of any suitable material including seamless or seamed tubular films of thermoplastics such as nylon blended with ethylene vinyl alcohol copolymer, or polyvinyl alcohol, but preferably comprises cellulosic casings e.g. the well-known regenerated cellulose casing. The manufacture of such casings is well known in the art and one of ordinary skill is aware of the common variations in such parameters as moisture content, type and amounts of such additives as plasticizers, antimycotics, etc. Such casings are typically gathered into shirred sticks as described above using well known processes and equipment. During the shirring operation it is common to coat the casing, particularly the inner surface of a tubular casing (e.g. by spraying), with a composition termed a shirr solution which may contain such ingredients as an anti-pleat lock agent, a lubricant, a surfactant, water and/or a humectant. Some components may serve multiple functions, e.g. when lecithin or mineral oil is used, these materials may act as anti-pleat lock agents and as lubricants which facilitate travel of the casing over a shirring mandrel or stuffing horn. Coating with a shirr solution is done to facilitate shirring of the casing and form easily deshirrable, self-sustaining sticks of shirred casing which are adapted for stuffing with products, particularly emulsions e.g. meat emulsions which form sausages. While casings may be coated by other means (including the well known methods of dipping and slugging), application of other additives and coating compositions via shirr solution spraying is convenient, economical and facilitates placement of a regular measured distribution of a coating on the casing surface. Prior art peeling aid compositions have been applied by spraying the inner surface of the casing via a shirring mandrel and such means of application are well known. Casings made according to the present invention, especially acidic tubular cellulose casings, are preferably coated with the inventive acid resistant peeling aid in such a manner.

In a preferred embodiment of the invention, casings treated with acidic liquid smoke, particularly acidic tar-depleted liquid smoke are coated with a peeling aid composition containing as essential components a water-soluble cellulose ether and dextrin and preferably also containing lecithin. In a most preferred embodiment such peeling compositions will also contain an anti-pleat lock agent, preferably mineral oil, and a surfactant, preferably a mixture of ethoxylated monodiglycerides. Lecithin may also be utilized as both the anti-pleat lock agent and surfactant, e.g. when used with mineral oil.

The preferred tar-depleted liquid smoke treated casing is preferably made utilizing an acidic tar-depleted concentrated liquid smoke prepared e.g. in accordance with the teaching of U.S. Pat. No. 4,540,613. Preferably this liquid smoke is externally applied to the casing using a foam applicator. This may be done, e.g. by a process similar to that disclosed in U.S. Pat. No. 4,356,218. Preferably the casing will have been treated prior to addition of the liquid smoke with phosphates to inhibit formation of black spots or discoloration e.g. in accordance with U.S. Pat. No. 4,511,613. Beneficially, the casing is treated with a base prior to addition of the acidic liquid smoke such that upon drying of the liquid smoke treated casing and prior to shirring, the casing has a pH value of from about 5 to 6. The descriptions and teachings of U.S. Pat. Nos. 4,540,613; 4,356,218; and 4,511,613 are hereby incorporated by reference in their entireties. Suitably, the tar-depleted smoke treated casings will contain at least 2 mg., and preferably at least about 5 mg. or more of smoke constituents per square inch of casing food contact area.

It has been found that liquid smoke treated casings, including tar depleted liquid smoke treated casings similar to that described above, have a tendency to become more acidic upon aging for periods of time such as may be expected with normal commercial storage, or upon exposure to heat, particularly at elevated temperatures. It has been discovered that refrigeration of such liquid smoke treated casing will retard this tendency of the casing to become more acidic (measurably lower pH values). However, refrigeration is costly requiring a capital outlay for equipment and having attendant maintenance and operation costs. Also, failure of the refrigeration equipment may occur, and as previously stated, the tendency to form a more acidic casing is merely retarded by refrigeration and not prevented. Therefore, it would be desirable to provide a casing coated with a peeling aid composition which is acid resistant as a supplement to or replacement for refrigeration.

In a preferred embodiment of the invention acidic casing or casing which is prone to becoming more acidic such as liquid smoke treated casing, will be refrigerated at temperatures sufficient to maintain a pH above about 5.2, preferably above about 5.4, for a period of at least about three months following extrusion and/or shirring. More preferably such period would be at least four months, beneficially at least six months and most preferably at least nine months to a year or more. Generally, the effect of maintaining pH is believed to improve with decreasing temperatures from ambient with suitable temperatures being about 40° F. (4° C.) or lower with temperatures of 30°-40° F. (−1° to 4° C.) preferred. While such refrigeration alone without use of dextrin will maintain high peelability of water-soluble cellulose ether-containing cellulose casing if the pH does not fall below about 5.2, it is most desirable to combine the benefits of refrigeration with those of the inventive release composition containing dextrin and preferably also containing lecithin.

The effects of storage time on casing pH under various temperature conditions were tested for a shirred, nonfibrous, tubular, cellulosic casing which had been treated with a concentrated tar depleted liquid smoke as described above. Results are reported in Table A; the indicated temperatures are approximate. In each example, liquid smoke treated casing was shirred using water applied through the shirring mandrel with mineral oil applied in air. The pH of the shirred casings was measured by placing 40 inches of casing into a 250 ml. flask with 25 ml. of demineralized water; after mixing for 2 minutes, the pH was measured by inserting a pH meter into the solution. Example 1A indicates that the pH of samples held under refrigeration was relatively stable for the first month, but had fallen by the 3 month measurement. The samples of Example 2A which were stored at room temperature began to exhibit a pH drop after one month, and the samples of Example 3A which were held at elevated temperatures exhibited a pH drop after about a week of storage. The above test indicates that liquid smoke treated casing exhibits a tendency to become more acidic over time with the rate of such acidification increasing with increasing storage temperature. A second series (Examples 4A-6A) of liquid smoke treated casings were coated during the shirring operation with a peeling aid composition containing an aqueous dispersion of a water-soluble cellulose ether (carboxymethyl cellulose), mineral oil, and a surfactant (Mazol 80 MG K) and the PH was measured under similar conditions. As shown in Table A, this second series of tests produced similar results to those reported for Examples 1A-3A in Table A.

TABLE A

| Example No. | Temperature °F. (°C.) | pH Initial | 2 | 9 | 30 | 90 (Days) |
|---|---|---|---|---|---|---|
| 1A | 30-40 (−1 to 4) | 4.9 | 4.9 | 4.9 | 4.9 | 4.4 |
| 2A | 70-80 (21 to 27) | 4.9 | 4.9 | 4.9 | 4.8 | 4.3 |
| 3A | 120 (49) | 4.9 | 4.9 | 4.7 | 4.5 | 4.0 |
| 4A | 30-40 (−1 to 4) | 4.9 | 4.9 | 4.9 | 4.9 | 4.4 |
| 5A | 70-80 (21 to 27) | 4.9 | 4.9 | 4.9 | 4.8 | 4.3 |
| 6A | 120 (49) | 4.9 | 4.9 | 4.8 | 4.5 | 3.9 |

The food casings of the present invention may be prepared from tubular casings, particularly non-fibrous casings of regenerated cellulose. These coated casings are fabricated in accordance with any of the known commercial methods of applying a coating composition, typically to the internal surface thereof. The coating composition components are more fully described below.

An essential component of the coating suitable for use in accordance with the practice of the present invention can be generally designated as water-soluble cellulose ethers. Typical water-soluble cellulose ethers which may be employed are the non-ionic water-soluble alkyl and hydroxyalkyl cellulose ethers such as, for example, methylcellulose, hydroxypropyl methylcellulose, hydroxypropylcellulose, ethyl methylcellulose, hydroxyethylcellulose and ethyl hydroxyethylcellulose and preferably the anionic water-soluble cellulose ethers such as, for example, carboxymethylcellulose and carboxymethyl hydroxyethylcellulose. Commercially, carboxymethylcellulose (CMC) and carboxymethylhydroxyethylcellulose are almost always sold as the sodium salt, and it is well established trade practice not to refer to the commercial product as the sodium salt. For the purpose of this application, reference to these anionic materials shall include salts thereof e.g. the sodium salt and other alkali metal salts thereof.

The amount of water-soluble cellulose ether present on the internal surface of the food casing, which is necessary to impart desired release characteristics, can vary over a wide range; though very small quantities are actually required. In general, tubular casings of the present invention will contain at least about 0.001 milligram of cellulose ether per square inch of casing surface (0.0002 mg/cm$^2$), and preferably between about 0.002 mg/in$^2$ and 0.09 mg/in$^2$ (0.0003-0.014 mg/cm$^2$) of said cellulose ether. Especially preferred are casings having a coating on the internal surface thereof between about 0.03 mg/in$^2$ and 0.07 mg/in$^2$ (0.005-0.011 mg/cm$^2$) of said cellulose ether. Greater amounts of the cellulose ether component may be used, if desired, although generally it will not materially improve the release characteristics of the casing and with certain types of meat formulations or processing conditions, fat separation may be encountered.

An essential component of the coating composition for casings according to the present invention is dextrin. Dextrins are products formed by hydrolysis of starches by acid and/or heat. Starches are polymers which occur naturally in plants. Commercial sources of starches include cereal grains such as corn, wheat, rice and sorghum, and roots such as potato, arrowroot and tapioca (cassava). Typically starches are a mixture of amylose and amylopectin and the relative amounts of these polysaccharides have a major influence on starch properties. Also, for these starch constituents the average degree of polymerization and distribution of molecular size will vary from one plant variety to another e.g. tapioca starch has a typical amylose content of about 17-22 percent while the amylose content of corn starch is about 22-28 percent. Starches may be modified and converted to dextrins by controlled degradation to break polymeric bonds and produce low molecular weight fragments. The properties of dextrins may vary e.g. depending upon the plant source of the starch. Starch conversion to dextrins is typically carried out by the action of heat either alone or in combination with acid, although other methods of dextrin formation are known e.g. by use of enzymes, or acid without heating. Dextrins formed by application of heat are also known as pyrodextrins and include British gum, yellow dextrin (canary dextrin) and white dextrin. Primary variables in the pyrodextrinization process, aside from the plant source of the starch, are moisture content, the presence or absence and amount and type of an acid or catalyst, and heating conditions including temperature and time of reaction. Many dextrins of varying viscosities and solubilities in water are commercially produced, often by proprietary processes. Tapioca dextrins are known as high quality dextrins which may produce dispersions of excellent clarity, and stability. Starches, dextrins and processes for their manufacture are further described in the following three references, the teachings of which are hereby incorporated by reference: Rutenberg M. W. "Starch and Its Modifications", in: Davidson, R. L., *Handbook of Water-Soluble Gums and Resins,* Chapter 22, (McGraw-Hill, Inc., 1980); Satterthwaite R. W., et al "Starch Dextrins" in Whistler, R. L., *Industrial Gums,* 2nd ed., pp. 577–599 (Academic Press, 1973); and Kennedy H. M., "Starch and Dextrins in Prepared Adhesives", in: Whistler, R. L., *Starch Chemistry and Technology,* pp. 593–599 (Academic Press, 1984).

Preferred dextrins for use in the present invention are acid hydrolyzed pyrodextrins such as white or canary dextrins. Especially preferred are tapioca dextrins such as that commercially available from National Starch and Chemical Corporation of Bridgewater, N.J. under the brand designation Crystal Gum. Crystal Gum is described as a tapioca dextrin which is white to off-white in color having a pH of about 3.0 (in 1% solution) and a specific gravity of about 1.5. It is commercially available as a powder with an approximately 7 percent moisture content. Crystal Gum tapioca dextrin is further characterized as being easily dispersed in cold water, but requiring heating to achieve optimum solubility and as having a low viscosity while hot.

The amount of dextrin present on the internal surface of the casing, which is necessary to impart release characteristics, can vary over a wide range. In general, tubular casings of the present invention will contain sufficient dextrin to provide increased peelability in an acidic casing environment such as that present on a liquid smoke treated casing having a pH of less than 6, preferably less than about 5.5 and most preferably less than 5.0. Suitable amounts of dextrin range from 0.10 to about 1.0 mg/in$^2$ (0.016–0.155 mg/cm$^2$) of casing (food contact surface), and preferably from about 0.20 to about 0.70 mg/in$^2$, and most preferably from about 0.30 to about 0.50 mg/in$^2$. Lesser amounts of dextrin will have a decreased benefit on peelability of acidic casing. Use of amounts greater than 1.0 mg/in$^2$ while believed to be workable may negatively impact upon processing or shirred stick properties such as coherency and deshirr forces.

A preferred component of the inventive coating composition according to present invention is lecithin. Lecithin is a mixture of diglycerides of stearic, palmitic and oleic acids, linked to the choline ester of phosphoric acid. Most commercial lecithin is a mixture of naturally-occurring phospholipids which are derived from soybeans. Typical soybean lecithin comprises the following acids with approximate Percentages: palmitic (12%), stearic (4%), palmitoleic (9%); oleic (10%), linoleic (55%) linolenic (4%) and $C_{20}$ to $C_{22}$ acids including arachidonic (6%). Lecithin is an anti-pleat lock agent which may also act as a surfactant with both wetting and emulsifying properties. It may also promote peelability of the casing. Lecithin is known to function as a release aid, dispersant, lubricant, softener and to control viscosity in various food industry applications. Lecithin is an amphoteric emulsifier. As used herein, the term "lecithin" includes both unsubstituted lecithin and substituted lecithin which has been modified by chemical means. Suitable lecithin is commercially available from Central Soya Co., Inc. of Fort Wayne, Ind. under the brand designation Centrolex-P 6420. Centrolex-P 6420 is commercially available as a food grade, essentially oil-free, water dispersable and oil soluble granular soybean-derived lecithin having a minimum of about 97% of acetone insoluble phospholipids. Centrolex-P 6420 is further described in a product brochure from Central Soya entitled "Specification for Centrolex TM P, Granular Soybean Lecithin (Product Code 6420)" (Aug. 1, 1988) and a booklet entitled "The Lecithin Book". (December, 1989, Central Soya Co., Inc.) which brochure and booklet are hereby incorporated by reference in their entireties.

Since lecithin may be utilized in the present invention as an anti-pleat lock agent or possibly to enhance or potentiate a peeling aid, the amount of lecithin present on the internal surface of the casing may vary over a wide range. In general, the preferred tubular casings of the present invention will contain sufficient lecithin to favorably impact upon peelability, and deshirr forces. The water-soluble cellulose ether, dextrin and lecithin combination, particularly with an anti-pleat lock agent such as mineral oil and a surfactant such as ethoxylated monodiglycerides may show improved peelability, particularly at pH values below 7, relative to peeling aid compositions without lecithin and dextrins. The combination of dextrin and lecithin may act synergistically to improve peelability. Suitable amounts of lecithin may range from about 0.05 to 0.50 mg/in$^2$ or more, and preferably range from about 0.1 to 0.2 mg/in$^2$.

Anti-pleat lock agents suitable for use in admixture with water-soluble cellulose ethers to prepare the casings of the present invention include synthetic, natural, and modified oils including mineral, vegetable and animal oils such as refined animal and vegetable oils that are normally liquid at room temperature or have a melting point below about 100° F., food grade mineral oil, silicone oils and medium chain triglycerides. Also suitable as an anti-pleat lock agent are substances such as lecithin. Materials that are or may be placed in a dispersible form in media solutions have been found to be suitable. Typical of this type of material would be, for example, an aqueous emulsion of castor oil or mineral oil. Particularly suitable and preferred as an anti-pleat lock agent is mineral oil.

By use of the term "anti-pleat lock agent" is meant material which is capable of promoting deshirring of pleats by minimizing any tendency of the pleats of a shirred casing stick to unduely adhere to each other and thereby damage the casing by creation of pinholes, tears or breaks during deshirring and stuffing. The anti-pleat lock agent will preferably be effective in the presence of a water-soluble cellulose ether such as carboxymethylcellulose which ether is known to promote adhesion of pleats prior to deshirring.

Suitable amounts of an anti-pleat lock agent such as mineral oil will be present on the inner surface of the casing in order to assist in deshirring and to reduce deshirr forces. Suitable amounts of an anti-pleat lock agent, preferably mineral oil, may range from about 0.05 mg/in$^2$ to about 0.3 mg/in$^2$ or more (0.008–0.047 mg/cm$^2$), and preferably will be from 0.1 to 0.2 mg/in$^2$(0.016–0.031 mg/cm$^2$.

Additionally oils or lecithin may be added as a lubricant to the exterior surface of the casing operation to facilitate shirring. Lubricants help prevent tearing, breakage, and pinholing of casing during shirring operations e.g. as the casing passes through the shirring gears. Suitable amounts of exterior applied lubricants may range up to about 0.3 to 1.20 mg/in$^2$ or more (0.047–0.186 mg/cm$^2$, and preferably about 0.6 to 0.8 mg/in$^2$ (0.093–0.124 mg/cm$^2$. Greater amounts of lubricants are generally unnecessary, producing an oily casing with little or no added benefits while use of lesser amounts increases the possibility of breakage pinholing, tearing or other shirring defects.

Surfactants suitable for use in the coating compositions of the present invention include those surfactants which act as wetting agents for the cellulosic casing surface and/or as emulsifying agents for the oil such that the surfactant facilitates dispersion of the coating composition across the surface of the cellulosic casing. Nonlimiting examples of suitable surfactants include water dispersible or at least partially water-soluble surfactants such as alkylene oxide adducts of either fatty acids or partial fatty acid esters, for example, ethoxylated fatty acid partial esters of such polyols as anhydrosorbitols, glycerol, polyglycerol, pentaerythritol, and glucosides, as well as ethoxylated monodiglycerides, sorbitan trioleate, lecithin, and aliphatic polyoxyethylene ethers such as polyoxyethylene (23) lauryl ether.

Preferred surfactants include polyoxyethylene sorbitan fatty acid esters or mixtures thereof such as those sold under brand designation Tween such as Tween 80 (polyoxyethylene 20 sorbitan monooleate) (commercially available from ICI Americas Inc. of Wilmington, Del.), ethoxylated monodiglycerides or mixtures thereof such as those sold under the brand designation Mazol 80 MG K (commercially available from Mazer Chemical, Inc. of Gurnee, Ill.), sorbitan trioleate (commercially available from ICI Americas Inc. under the brand designation Span 85), and lecithin. An especially preferred surfactant is a mixture of ethoxylated monodiglycerides such as Mazol 80 MGK. Some surfactants are also known to act as anti-pleat lock agents e.g. lecithin and Tween 80.

Suitable amounts of a surfactant, such as a mixture of ethoxylated monodiglycerides (Mazol 80), may be present on the inner surface of the casing in order to wet the casing surface and assist in dispersing the anti-pleat lock agent, especially oils, and to emulsify and/or stabilize peeling aid compositions which contain components of varying solubilities. Suitable amounts of a surfactant may range from about 0.005 to about 0.06 mg/in$^2$ (0.0008–0.0093 mg/cm$^2$) and preferably for a surfactant of ethoxylated monodiglycerides such as Mazol 80 from about 0.01 to 0.02 mg/in$^2$ (0.002–0.003 mg/cm$^2$). Too little surfactant may lead to an uneven distribution of the coating composition on the casing surface and with increased surfactant any additional benefits are believed to be reduced in significance relative to the added cost or possible deleterious effect on shirred stick properties such as coherency, deshirring forces and straightness of the shirred stick.

A number of factors are known to affect the preparation of shirred casing sticks and the suitability of shirred casing sticks for use in the processing of various types of food products, particularly when high speed automatic equipment is employed in the shirring and stuffing operations. For example, when water is applied to the casing during the shirring process, it is known that take up by the casing of excessive amounts of water may cause the casing to seize on the shirring mandrel making further processing thereof very difficult, if not impossible. Also, addition of excessive water may cause swelling of the shirred casing leading to "growth" of the shirred stick particularly in length which may form nonuniform shirred sticks of varying length or straightness. However, addition of water does have the benefit of acting as a plasticizer which may facilitate the shirring operation. Accordingly, when it is desired to apply the coating compositions described herein, for example, while the tubular casing is passing over a shirring mandrel just prior to or during the shirring operation, the amount of coating composition applied while treating the internal surface of the casing with a water-soluble cellulose ether and dextrin is controlled to limit the amount of water added to the casing.

It is advantageous to avoid application of more coating composition than can be imbibed by the casing in order to prevent excess coating composition from being lost and wasted or from accumulating in localized areas of the shirred sticks with resulting detrimental effects thereto. Generally, not more than about 6 mg/in$^2$ (0.93 mg/cm$^2$) and preferably not more than about 5 mg/in$^2$ (0.78 mg/cm$^2$) of coating composition containing a water-soluble cellulose ether preferably in an amount of at least about 0.05% by weight and containing dextrin, preferably in an amount of at least 2% and optionally and preferably containing lecithin, preferably an amount of at least 1%, should be applied to the internal surface of the tubular casing. The application of said coating composition should be further controlled so that less than about 5 mg/in$^2$ (0.78 mg/cm$^2$) of water is applied to the surface of the casing while applying to the internal surface thereof at least about 0.001 mg/in$^2$ (0.0002 mg/cm$^2$) and preferably between about 0.03 mg/in$^2$ and 0.07 mg/in$^2$ (0.005–0.011 mg/cm$^2$) of cellulose ether, and at least about 0.1 mg/in$^2$ (0.0155 mg/cm$^2$) and preferably at least about 0.2 mg/in$^2$ (0.031 mg/cm$^2$) of dextrin and optionally but preferably at least about 0.05 mg/in$^2$ (0.008 mg/cm$^2$) and more preferably at least about 0.1 mg/in$^2$ (0.0155 mg/cm$^2$) of lecithin. The casing after shirring should have a suitable moisture content of about 25 to 50 percent by weight based upon bone dry cellulose and preferably about 30 to 40% for liquid smoke treated casing. Casing brittleness increases with decreasing moisture content and the tendency to produce curved, nonuniform and/or swollen shirred sticks subject to post-shirring elongation increases with higher moisture levels.

Another factor known to be especially important in affecting the suitability of shirred casing sticks for use with automatic food stuffing equipment, for example employed in the preparation of products such as frankfurters, is the durability or coherency of the shirred stick as a self-sustaining article. A disjoinder or break in the shirred stick prior to mounting on the stuffing apparatus may make the stick unsuitable for use. Accordingly, any treatment such as the application of a coating to a tubular food casing that is to be formed into shirred casing sticks must be considered in light of its effect on coherency. Advantageously, such coatings will assist in formation of shirred sticks of casing which have sufficient coherency to hold together from immediately after shirring through shipping and ultimate use, while allowing the shirred casing to be easily deshirred during stuffing operations without production of casing defects such as holes or tearing and without requiring undue force thereby minimizing such defects.

Following is a description of the coherency test that is used for determining this important characteristic of shirred casing sticks of the present invention.

COHERENCY TEST METHOD

Coherency (COH) of a casing stick is determined by measuring the bending moment in inch-pounds at the breaking of a stick. A casing stick is cradled on two V-notched support brackets secured on a base plate and spaced apart a distance (D) about 80% to 90% of the length of the casing stick being tested. A pressure member having V-notched struts spaced apart a distance of D less 4 inches is centrally lowered onto the top of the casing stick. A downward pressure is provided by lowering a force gauge (such as Chatillon Digital Force Gauge, Model DFG-10 with a "Hold at Maximum Device"), that is secured centrally to the pressure member at a constant velocity of about 8½ inches per minute. The force is increasingly applied until the casing stick breaks. The maximum force reading P in pounds is noted. The bending moment in inch pounds at break on the apparatus is equal to $P/2 \times 2$ inches, and thus the force reading P equates to inch-pounds of bending moment to break the casing stick. In general, a coherency of at least about 1.0 inch-pound (1.2 cmKg) is required to provide shirred sticks of sufficient integrity to survive normal packaging and handling operations from the time of shirring until use on a stuffing machine, a coherency of at least about 2.0 inch-pounds (2.3 cmKg) is desirable, and at least 2.5 inch-pounds (2.9 cmKg) is especially suitable and preferably at least 3.0 inch-pounds (3.5 cmKg) is achieved.

Another factor that is important in affecting the suitability of shirred casing sticks for use with automatic food stuffing equipment is the deshirring force required to deshirr the casing. If the required deshirring force is excessive, tearing of casing will result during deshirring. A deshirring force test, as described below, was employed in evaluating the coated casings of the present invention.

DESHIRRING FORCE TEST

This test was used to determine the force required to deshirr a selected stick of casing in the direction in which it would be stuffed. The apparatus used consists of a force gauge (Model DFG-2, Chatillon Digital Force Gauge, measuring from 0 to 2 pounds in 0.001 lb. increments) and a pulley with an attached reeling device which is used to pull and deshirr the casing from the shirred stick. Using this equipment, a casing stick is pulled and deshirred at a constant speed of about 60 inches per minute.

The test procedure for the deshirring force tests consists of the following steps:

(a) From the selected shirred stick, an approximately 2 inch (3 cm) sample is removed from the open end, the middle, and the closed end of the stick.

(b) The closed end disposed portion of each stick sample is deshirred by hand approximately 1 inch (2.5 cm). Then the open end disposed portion (cone portion) of each stick is wrapped with adhesive tape to ensure that the casing will not deshirr at that cone position and to provide a tab for clamping.

(c) The deshirred portion of the stick is clamped to the force gauge using a spring clamp which is attached to the gauge. The other (taped) end of the stick is clamped to the reeling device attached to the pulley.

(d) The reeling device and pulley mechanism is started and the casing deshirring begins. A chart recorder continuously records measurements of the deshirring force on the force gauge. The minimum values obtained for each section of the shirred stick are averaged as are the maximum values and the test is repeated with two additional sticks of casing. The nine minimum values obtained are averaged to provide the average minimum deshirr force. Also, the nine maximum values measured are averaged and reported as the maximum deshirr force.

The maximum deshirr force is an indication of the likelihood of failure of a shirred stick during stuffing operations. High speed deshirring upon stuffing with automatic stuffing equipment is likely to cause tears, breakage or pinholes in casing exhibiting excessively high deshirr forces.

Actual deshirr force values of casing will vary depending upon such well known parameters as casing diameter and type and size of shirring pleats, as well as the presence, type and amount of any coating on the casing.

The invention will become more clear when considered together with the following examples which are set forth as being merely illustrative of the invention and which are not intended, in any manner, to be limitative thereof. Unless otherwise indicated, all parts and percentages are by weight.

EXAMPLES 1-8

Coating compositions were prepared for Examples 1–4 by mixing in a Waring blender a water-soluble sodium carboxymethylcellulose (CMC) (commercially available from Hercules, Incorporated of Wilmington, Del. under the trade designation Cellulose Gum 7LF) and deionized water followed by addition to the dissolved CMC of lecithin commercially available from Central Soya Co., Inc. of Fort Wayne, Ind. under the trade name Centrolex-P 6420) which had previously been melted in mineral oil and mixed with an emulsifier of ethoxylated monodiglycerides (commercially available from Mazer Chemical, Inc. of Gurnee, Ill. under the trade designation Mazol 80 MG K). This mixture is blended on high and then added to tapioca dextrin (commercially available from National Starch and Chemical Corporation of Bridgewater, N.J. under the trade name Crystal Gum) which had previously been dispersated with heating to about 180° F. (82° C.) in deionized water. The entire mixture was thoroughly mixed in a dispersator and then allowed to sit overnight to deaerate followed by slow dispersating for 1½-2 hours at 20 rpm to redisperse the mixture prior to use. Examples 5–8 were similarly prepared except as follows. Examples 5–8 did not contain lecithin. Examples 6–8 did not contain tapioca dextrin. Also, Example 8 replaced the Mazol 80 MG K with a polyoxyethylene 20 sorbitan momooleate (commercially available from ICI Americas Inc. of Wilmington, Del. under the trade designation Tween 80). The weight percent composition of each component for each coating of examples 1–8 is listed in Table 1 with the balance of each composition being water.

| Value | |
|---|---|
| 5 | Immediate release of casing from meat surface without working. |
| 4 | Peels with slight amount of working. |

-continued

| Value | |
|---|---|
| 3 | Casing peels with some working; peeled casing is free of meat. |
| 2 | Casing peels with much working; some meat may adhere to peeled casing. |
| 1 | Casing adheres to meat and does not peel. |

Commercially produced nonfibrous casings of regenerated cellulose made from viscose having a flat width of about 1.3 inches (3.3 cm.) were used to prepare casings of these examples. These casings were treated as described above with acidic, concentrated, tar-depleted liquid smoke (See e.g. U.S. Pat. Nos. 4,356,218, 4,511,613 and 4,540,613) to provide a smoke color and flavor transferable casing and were also treated with phosphates to inhibit discoloration and black spot formation on the casing. These casings were kept as roll stock for approximately four months and then were shirred on an apparatus similar to that disclosed in U.S. Pat. No. 2,984,574 by a method similar to that disclosed in U.S. Pat. No. 4,818,551. As each length of tubular cellulose casing was being shirred, the particular coating composition was applied by metering through the shirring mandrel along with a stream of inflation air. For Examples 1-3 and 5-8 the amount applied was about 4.82 mg. of coating composition per square inch of casing (0.747 mg/cm$^2$) and for Example 4, the amount applied was about 3.75 mg. per square inch of casing (0.581 mg/cm$^2$). The resulting shirred coating casings of Examples 1-3 and 5-8 had a moisture content between about 41-46 percent. Example 4 had a moisture content of about 36 percent.

The pH was measured for casing of each example by cutting a forty inch (102 cm) length of deshirred casing into small pieces and vigorously shaking the pieces with 25 ml. of deionized water in a flask followed by standing for 20 minutes with a subsequent second period of shaking. The pH was then measured using a pH meter after allowing the casing pieces in the liquid to settle. The pH results are reported in Table 1.

The pH was measured about 1 month after shirring with room temperature storage. The pH was also measured at about 1½ months with approximately 2 weeks of heat aging at about 55° C. The pH was again measured at 4 months after shirring with room temperature storage. The pH results demonstrate that over time, particularly at elevated temperatures, the pH of liquid smoke treated casing drops from initial values and the casing becomes more acidic.

Physical properties of the shirred sticks of casing including coherency and both minimum and maximum deshirring forces were measured initially (1-3 days after shirring). The deshirring forces were also measured at about 3 months after shirring. The results are reported in Table 1. The deshirr forces were rounded to the hundredths place with a general significance of ±0.05 lb. All of the Examples 1-5 and comparative Examples 6-8 formed shirred sticks of excellent initial coherency as measured about 3 days after shirring. The coated casings of the present invention all had good minimum deshirr forces which for Examples 1-4 were lower both initially and at three months than those values of comparative examples 7-8. The initial maximum deshirr forces were similar for all of the inventive examples and comparative examples except that the initial maximum deshirr force for Example 3 of the invention was significantly lower, while that value for comparative example 7 was significantly and undesirably higher. At three months following shirring there was a tendency towards increasing maximum deshirr forces, although inventive Examples 1, 2 and 4 had very good stability with little change in values as compared to the comparative examples. In particular, the initial and three month test data of Example 1 of the invention indicates very stable minimum and maximum deshirr force values for the casing tested. Such stability is desirable to avoid variations in casings of different ages thereby allowing users to produce uniformly sized sausages during stuffing with casing of various ages. For nonfibrous liquid smoke treated cellulosic casing having a flat width of about 1.3 inches (3.3 cm) an average maximum deshirr force of less than about 0.8 pounds is preferred. Examples 1-4 of the invention all have good deshirr force values and the initial values for Example 5 are also good. The effects of lecithin and dextrin on deshirr forces can be seen directly by comparing Examples 2 versus 5 and 5 versus 6, respectively. Removal of lecithin substantially increases deshirr forces, as does addition of dextrin.

Peelability of the above casing from cooked frankfurters was tested at 2 months by stuffing shirred, liquid smoke treated casing which was coated with the compositions indicated above in Table 1 followed by hand peeling of the casing. Coated shirred casing was stuffed with a high collagen content, frankfurter-type meat emulsion using a hand operated table stuffer with links formed by twisting the casing by hand. The stuffed casing was then placed in an 82° C. over for about two hours after which the cooked encased sausages were placed in trays containing room temperature deionized water for a period of 2-3 minutes followed by chilling in a 10% salt brine ice water bath (about 0° C.) until peeled. After removal from the bath the casing for each link was slit lengthwise with a razor and the casing peeled off. The peelability of casings for each example was evaluated and assigned a number from 1 to 5 with ½ point increments on the basis of how much working or manipulation of the encased frankfurter by rolling and handling of the encased product between the evaluator's thumb and fingers was required to overcome meat adhesion to the casing. The evacuator attempted to displace the inside surface of the casing from the meat surface without damage to the sausage meat such as tearing or sticking of the casing. Five encased links were evaluated for each example and the average value reported to the nearest ½ in Table 1. The rating system employed was as follows:

TABLE 1

| EXAMPLE NO. | COMPOSITION (WT. %) | | | | | pH | | |
|---|---|---|---|---|---|---|---|---|
| | CMC | MAZOL 80 | MINERAL OIL | DEXTRIN | LECITHIN | 1 | 1½* (MONTHS) | 4 |
| 1 | 1.13 | .32 | 3.44 | 7.08 | 2.13 | 5.2 | 4.6 | 4.9 |
| 2 | 1.16 | .33 | 3.52 | 4.73 | 2.18 | 5.1 | 4.6 | 4.8 |
| 3 | 1.19 | .34 | 3.62 | 2.24 | 2.24 | 5.1 | 4.7 | |
| 4**** | 1.49 | .42 | 4.52 | 6.06 | 2.80 | 5.2 | 4.8 | |

TABLE 1-continued

| | | | | | | | | |
|---|---|---|---|---|---|---|---|---|
| 5 | 1.18 | .34 | 3.60 | 4.83 | — | 5.1 | 4.6 | |
| 6 | 1.25 | .35 | 3.79 | — | — | 5.1 | 4.7 | |
| 7 | 2.94 | .34 | 3.72 | — | — | 5.1 | 4.8 | |
| 8 | 2.92 | 1.14*** | 3.69 | — | — | 5.1 | 4.6 | 4.9 |

| | SHIRRED STICK PROPERTIES | | | | | | |
|---|---|---|---|---|---|---|---|
| | COH | DESHIRR FORCE (lb) | | HAND | MACHINE TEST | | |
| EXAMPLE | in. lb. | 1-3 DAY | 3 MONTH | PEEL | % PEELABILITY | | |
| NO. | 3 DAYS | MIN/MAX | MIN/MAX | 2 MO | 1 MO | 3 MO | 5 MO |
| 1 | 4.1 | .35/.70 | .37/.70 | 4 | 99 | 100 76** | 83 |
| 2 | 4.0 | .35/.69 | .38/.76 | 4 | 100 | 96 81** | 51 |
| 3 | 3.3 | .29/.56 | .37/.71 | 5 | 100 | — | — |
| 4**** | 3.5 | .42/.69 | .44/.78 | 5 | 100 | — | — |
| 5 | 4.4 | .38/.68 | .66/.98 | 3.7 | 100 | — | — |
| 6 | 4.4 | .38/.69 | .45/.82 | 2.1 | 99 | — | — |
| 7 | 6.3 | .71/.96 | .84/1.21 | 3.3 | 100 | — | — |
| 8 | 3.2 | .46/.66 | .59/.97 | 2.8 | 100 | 36 7** | 17 |

*Period includes heat aging at about 55° C. for about 2 weeks.
**Three month period included heat aging about 1 week at 55° C.
***Mazol 80 was replaced with polysorbate 80.
****Coating composition was applied to inner surface of casing at rate of 3.75 mg/in² (In Examples 1-3 and 5-8 the rate was 4.82 mg/in²).

The shirred coated casings were also tested one month after shirring for peelability on a commercial stuffer and a high speed machine peeler. A frankfurter-type meat emulsion prepared from a formulation containing beef and pork trimmings and a high content of collagenous materials was stuffed into shirred lengths of casing, linked into frankfurters, and cooked in a smokehouse using conventional procedures and equipment. During cooking, no additional smoke was added. Stuffing was performed on a Supermatic RT7 brand stuffer (available from Townsend Engineering Company of Des Moines, Iowa). Generally the processing cycle used consisted of an approximately 30 minute period during which time the temperature of the smokehouse was increased from about 140° F. (60° C.) to about 180° F. (82° C.) while maintaining a relative humidity of about 20%. The temperature of the smokehouse was maintained at about 180° F. (82° C.) with 20% relative humidity until the internal temperature of the test samples of the encased frankfurter reached 160° F. (71° C.) at which time the cooked encased frankfurters were showered in the smokehouse with tap water for ten minutes. The cooked and showered, encased frankfurters were then removed from the smokehouse and treated to ten minutes of chilling in a brine shower. The cooked, showered and chilled frankfurters were removed from the brine chiller, placed in a tray with ice water and then fed into a Ranger Apollo brand peeler (available from Townsend Engineering Company of Des Moines, Iowa) for high speed machine removing of the casing from the cooked foodstuff. Results of the peeling tests are reported in Table 1. Peelability is reported as a percent of the number of frankfurter links which peeled relative to the total number of frankfurter links subject to the peeling operation (i.e. 100% denotes that the entire casing was peeled from all frankfurter links and the peeled casing was free of meat). For each example, at least 400 links were stuffed and fed to the peeler.

The above one month peeling test was repeated for Examples 1, 2 and 8 at three months after shirring (about 7 months after extrusion and coating with liquid smoke) and under similar conditions to the above one month test except additional samples of casing for each example were subjected to storage at elevated temperature (about 55° C.) for about one week during the three month interval from shirring. Therefore, peelability of casings which were aged at room temperature for the entire three month period was compared to similar casing whose three month aging period included about one week storage at about 55° C. The results are reported in Table 1.

The above one month peeling tests was repeated for Examples 1, 2 and 8 at 5 months after shirring (about 9 months after extrusion and coating with liquid smoke). This test was conducted under similar conditions to the one month test except that the stuffer utilized was a Frankamatic DB-2 brand stuffer (commercially available from Townsend Engineering Company of Des Moines, Iowa).

Comparison of the peeling test data in Table 1 demonstrates that the inventive acid resistant coated casing provides improved peelability. The high speed machine peeling test made at one month after shirring with room temperature storage showed from 99-100% peelability for all of the examples and comparative examples. The superior peelability of the invention is evident in tests conducted upon further aging. In the hand peeling test conducted at two months after shirring, the casings of the invention (Examples 1-5) were all evaluated as superior in peelability to all of the comparative Examples 6-8. In particular, Examples 1-4 which contained lecithin demonstrated very good to excellent peelability. The second high speed machine peeling test (conducted at about 3 months after shirring of Examples 1 and 2 of the invention and comparative Example 8) confirmed that the peelability of aged shirred casing having coatings of the invention was greatly superior to that of comparative Example 8; this was demonstrated for samples stored at room temperature and also for samples whose storage time included a period of heat aging at about 55° C. for about one week. A further test of peelability was made of casing stored at room temperature for 5 months after shirring. In this 5 month test the inventive casings of Examples 1 and 2 machine peeled at rates over 3 to 4 times greater than that for the casing of comparative Example 8.

In comparative Example 6 a water-soluble cellulose ether was applied to casing in similar amounts of CMC per unit area surface as for Examples 1-5. Other components of the composition of comparative Example 6 were likewise similar to Examples 1-5 except that Example 6 did not contain dextrin or lecithin. Example 6 had poor peelability as shown by the two month hand peel test. Comparative Example 7 was similar to comparative Example 6 except that the amount of carboxymethylcellulose (CMC) was increased. The two month hand peel test indicates that increasing the amount of CMC improves peelability and coherency, but deshirr forces became undesirably high which can lead to an increase in pinholes, tearing and breaking during stuffing operations. The improved peelability of comparative Example 7 was still inferior to that of the Examples of the invention 1-5 which examples also had lower deshirr force values than comparative Example 7. In comparative Example 8, a coating composition similar to that of comparative Example 7 was employed except that the surfactant (Mazol 80) was replaced with polysorbate 80 (Tween 80) and a greater amount of this different surfactant was used. Comparative Example 8 had good coherency and acceptable deshirr forces which values were reduced from those of comparative Example 7. However, the peelability of the coated casings of comparative Example 8 was very inferior to the inventive coated casing as shown in the 2 month hand peel test and in the 3 and 5 month machine peel tests.

The above test demonstrate that the inventive casings which contain a water-soluble cellulose ether and dextrin (and preferably also lecithin) have improved peelability especially when the casings are acidic, particularly at pH values less than 5.0.

The inventive casings of Example 1-5 and particularly Examples 1-4 which contained lecithin show an excellent combination of desirably low deshirr forces with excellent coherency and very good to excellent peelability for acidic casing. In contrast, the comparative examples have undesirably low peelability and in Example 7 undesirably high deshirr forces.

EXAMPLES 9-14

Examples 9-14 are comparative examples (not of the invention) which examine the effect of lecithin as a peeling aid for casing. Similar regenerated cellulose casing was used for all of the examples except that examples 9-12 were coated with an aqueous dispersion of mineral oil, a surfactant (Mazol 80), and a humectant (propylene glycol), while Examples 13 and 14 additionally contained a water-soluble cellulose ether peeling aid (CMC), but did not contain propylene glycol. Examples 11, 12 and 14 were treated with a tar-depleted liquid smoke solution prior to the shirring operation while the above noted aqueous dispersions were added to the casing during the shirring operation through a shirring mandrel. Lecithin was added to the casing of Examples 10 and 12 in the amount of about 2 percent by weight of the aqueous dispersion. The coated casings of Examples 9-14 were similarly stuffed with a meat emulsion to a diameter of about 22 mm, cooled and peeled under conditions optimized for peeling of casings coated with a CMC containing peeling aid. Four shirred sticks of casing were stuffed and subjected to machine peeling operations. Table 2 reports the average percentage of peelability for each example.

TABLE 2

| Example No. | CASING DESCRIPTION Type | Treatment Liquid Smoke | Treatment CMC | Lecithin % | MACHINE PEEL TEST # of Sticks | MACHINE PEEL TEST % Peelability Avg. | MACHINE PEEL TEST % Peelability S.D.* |
|---|---|---|---|---|---|---|---|
| 9 | Regenerated cellulose** | No | No | — | 4 | 48.1 | 16.6 |
| 10 | Regenerated cellulose** | No | No | 2 | 4 | 49.4 | 19.5 |
| 11 | Regenerated cellulose** | Yes | No | — | 4 | 0.4 | 0.6 |
| 12 | Regenerated cellulose** | Yes | No | 2 | 4 | 1.7 | 1.5 |
| 13 | Regenerated cellulose*** | No | Yes | — | 4 | 99.2 | 1.6 |
| 14 | Regenerated cellulose*** | Yes | Yes | — | 4 | 99.2 | 1.6 |

*S.D. = Standard Deviation
**Nonfibrous regenerated cellulose casing coating included mineral oil, Mazol 80 and propylene glycol.
***Nonfibrous regenerated cellulose casing coating included mineral oil and Mazol 80.

A comparison of Examples 9-14 indicates that lecithin without CMC does not function as a peeling aid for either regular or liquid smoke treated casing. Previous Examples 1-5 indicate that lecithin in combination with dextrin and a water-soluble cellulose ether such as CMC may enhance the peelability of casings coated with dextrin and a water-soluble cellulose ether peeling aid.

EXAMPLES 15-16

A laboratory peelability test was conducted similar to the manual peeling test described above for Examples 1-8. In Examples 15-16 tar-depleted liquid smoke treated casings were similarly prepared and shirred using an aqueous dispersion of the compositions indicated in Table 3 to coat the inside surface of the tube during shirring by spraying through the shirring mandrel. Within one week of shirring these coated shirred casings were stuffed, cooled and peeled following the procedure descried in Examples 1-8. The peelability of the encased frankfurters was examined and evaluated on a scale of 1-5 as described above for Examples 1-5. Results are reported in Table 3.

TABLE 3

| Example No. | Composition (wt. %) CMC | Composition (wt. %) Mazol 80 | Composition (wt. %) Mineral Oil | Composition (wt. %) Dextrin | Composition (wt. %) Lecithin | Laboratory (Hand) Peelability |
|---|---|---|---|---|---|---|
| 15 | 1.0 | 0.45 | 2.0 | 12.5 | — | 5 |
| 16 | 0.98 | 0.44 | 2.0 | 12.3 | 2.0 | 5+ |

Both examples of the invention demonstrated excellent peelability in the laboratory peel test with the lecithin containing example exhibiting remarkable peelability and also a slightly darker color transfer of liquid smoke from the casing to the surface of the frankfurter.

In view of the above description, examples and the claims, different embodiments, modifications and changes will be apparent to those skilled in the art and all such modifications, embodiments and changes are deemed to be within the scope of the inventions defined by the following claims.

What is claimed is:

1. A tubular acid resistant release coated food casing comprising a casing having a coating on the inner surface thereof in an effective amount to provide a high speed machine peelable casing wherein said coating comprises a water-soluble cellulose ether and pyro dextrin in an acidic casing environment.

2. A casing, as defined in claim 1, wherein said coating further comprises a lecithin.

3. A casing, as defined in claim 1, wherein said coating further comprises an anti-pleat lock agent.

4. A casing, as defined in claim 3, wherein said coating further comprises a surfactant.

5. A casing, as defined in claim 1, wherein said casing is treated with liquid smoke and said casing has a pH of less than 6.0.

6. A casing, as defined in claim 1, wherein said casing comprises a nonfibrous regenerated cellulose casing.

7. A casing, as defined in claim 1, wherein said casing is in the form of a shirred stick.

8. A casing, as defined in claim 1, wherein said pyro dextrin comprises an acid hydrolyzed pyrodextrin.

9. A casing, as defined in claim 1, wherein said pyro dextrin comprises a tapioca dextrin.

10. A shirred, tubular, nonfibrous, cellulosic, liquid smoke treated food casing having a pH of less than about 6.0 and having a release coating on the inner surface thereof, said coating comprising a mixture of a pyro dextrin and a water-soluble cellulose ether.

11. A casing, as defined in claim 10, wherein said release coating further comprises a lecithin.

12. A casing, as defined in claim 10, wherein said release coating further comprises an anti-pleat lock agent, and a surfactant.

13. A casing, as defined in claim 10, wherein said casing has a moisture content of at least about 25 weight percent based upon bone dry cellulose.

14. A casing, as defined in claim 10, wherein said release coating further comprises mineral oil, lecithin and a surfactant selected from the group of ethoxylated monodiglyceride, sorbitan trioleate, an alkylene oxide adduct of a fatty acid or partial fatty acid ester, and an aliphatic polyoxyethylene ether, or mixtures thereof.

15. A casing, as defined in claim 14, wherein said cellulose ether is present in an amount of from about 0.002 to about 0.09 mg/in$^2$; said dextrin is present in an amount of at least about 0.2 mg/in$^2$; said lecithin is present in an amount of from about 0.05 to about 0.50 mg/in$^2$; said mineral oil is present in an amount of at least 0.05 mg/in$^2$; all amounts based on said coated casing surface.

16. A cellulosic casing having a coating thereon, said coating comprising a mixture of a water-soluble cellulose ether, an oil, a surfactant, dextrin and lecithin in an effective amount to provide a machine peelable casing with an acid resistant coating wherein said casing is suitable for processing food products therein.

17. A casing, as defined in claim 16, wherein said casing has a pH of less than 6.0.

18. A casing, as defined in claim 16, wherein said casing has a pH of less than 5.5.

19. A casing, as defined in claim 16, wherein said casing has a pH of less than 5.0.

20. A casing, as defined in claim 16, wherein said casing contains liquid smoke.

21. A casing, as defined in claim 16, wherein said casing contains tar-depleted liquid smoke.

22. A casing, as defined in claim 16, wherein said casing contains at least 2 mg of tar-depleted liquid smoke constituents per square inch of the casing inner surface.

23. A casing, as defined in claim 16, wherein said casing comprises regenerated cellulose.

24. A casing, as defined in claim 16, wherein said casing comprises non-fibrous, tubular casing having said coating on the inner surface of said tubular casing.

25. A casing, as defined in claim 16, wherein said casing is in the form of a shirred stick.

26. A casing, as defined in claim 25, wherein said shirred stick has a coherency value of at least 1.0.

27. A casing, as defined in claim 25, wherein said shirred stick has a coherency value of at least 2.0.

28. A casing, as defined in claim 25, wherein said shirred stick has a coherency value of at least 3.0.

29. A casing, as defined in claim 16, wherein said cellulose ether is selected from the group consisting of methylcellulose, hydroxyethylcellulose, carboxymethyl hydroxyethylcellulose, hydroxypropylcellulose, hydroxypropyl methylcellulose, carboxymethylcellulose and salts thereof.

30. A casing, as defined in claim 16, wherein said cellulose ether comprises carboxymethylcellulose or a salt thereof.

31. A casing, as defined in claim 16, wherein said surfactant comprises an ethoxylated monodiglyceride or mixtures thereof.

32. A casing, as defined in claim 16, wherein said surfactant comprises an alkylene oxide adduct of a fatty acid or partial fatty acid ester.

33. A casing, as defined in claim 16, wherein said surfactant comprises a polyoxyethylene sorbitan fatty acid ester or mixture thereof.

34. A casing, as defined in claim 16, wherein said dextrin comprises an acid hydrolyzed pyrodextrin.

35. A casing, as defined in claim 16, wherein said dextrin comprises a tapioca dextrin.

36. A casing, as defined in claim 16, wherein said cellulose ether is present in an amount of at least 0.001 mg/in$^2$ of coated casing surface.

37. A casing, as defined in claim 16, wherein said cellulose ether is present in an amount of from about 0.002 to about 0.09 mg/in$^2$ of coated casing surface.

38. A casing, as defined in claim 30, wherein said carboxymethylcellulose or a salt thereof is present in an amount of from about 0.03 to about 0.07 mg/in$^2$ of coated casing surface.

39. A casing, as defined in claim 16, wherein said dextrin is present in an amount of from about 0.10 to about 1.0 mg/in$^2$ of coated casing surface.

40. A casing, as defined in claim 16, wherein said dextrin is present in an amount of at least about 0.20 mg/in$^2$ of coated casing surface.

41. A casing, as defined in claim 16, wherein said dextrin is present in an amount of from about 0.20 to about 0.5 mg/in$^2$ of casing surface.

42. A casing, as defined in claim 16, wherein said lecithin is present in an amount of from about 0.1 to about 0.2 mg/in$^2$ of coated casing surface.

43. A casing, as defined in claim 16, wherein said lecithin is present in an amount of from about 0.05 to about 0.50 mg/in$^2$ of coated casing surface.

44. A casing, as defined in claim 16, wherein said oil is present in an amount of at least 0.05 mg/in$^2$ of coated casing surface.

45. A casing, as defined in claim 16, wherein said surfactant is present in an amount of from 0.005 to about 0.06 mg/in$^2$ of coated casing surface.

* * * * *

UNITED STATES PATENT AND TRADEMARK OFFICE
CERTIFICATE OF CORRECTION

PATENT NO. : 5,230,933
DATED : JULY 27, 1993
INVENTOR(S) : P.B. APFELD ET AL.

It is certified that error appears in the above-identified patent and that said Letters Patent is hereby corrected as shown below:

Col. 3, line 19, after "applied" insert --to--.

Col. 3, line 38, delete "showing" and insert --showering--.

Col. 14, line 37, before "commercially" insert --(--.

Col. 14, line 57, delete "momooleate" and insert --monooleate--.

Col. 14, line 65-Col. 15, line 8, the rating system should be moved to Col. 16, line 60 after "follows:".

Col. 16, line 53, delete "evacuator" and insert --evaluator--.

Col. 16, line 60 et seq, Table 1 should be at Col. 14, line 63 et seq.

Col. 20, line 48, delete "descried" and insert --described--.

Col. 21, line 5, delete "pyro dextrin" and insert --pyrodextrin--.

Col. 21, line 5, delete "pyro dextrin" and insert --pyrodextrin--.

Col. 21, line 3, delete "dextrin" and insert --pyrodextrin--.

Signed and Sealed this

Twelfth Day of July, 1994

Attest:

BRUCE LEHMAN

Attesting Officer    Commissioner of Patents and Trademarks